(12) United States Patent
Aradachi et al.

(10) Patent No.: US 8,294,425 B2
(45) Date of Patent: Oct. 23, 2012

(54) CHARGING APPARATUS AND CHARGE CONTROL METHOD

(75) Inventors: Takao Aradachi, Hitachinaka (JP); Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 13/058,284

(22) PCT Filed: Jul. 30, 2009

(86) PCT No.: PCT/JP2009/063903
§ 371 (c)(1), (2), (4) Date: Feb. 9, 2011

(87) PCT Pub. No.: WO2010/029823
PCT Pub. Date: Mar. 18, 2010

(65) Prior Publication Data
US 2011/0140664 A1   Jun. 16, 2011

(30) Foreign Application Priority Data
Sep. 9, 2008   (JP) .................................. 2008-230477

(51) Int. Cl.
*H02J 7/00*   (2006.01)
*H02J 7/04*   (2006.01)

(52) U.S. Cl. ........ 320/116; 320/119; 320/127; 320/128; 320/132; 320/152

(58) Field of Classification Search .................... 320/116
See application file for complete search history.

(56) References Cited

U.S. PATENT DOCUMENTS

| 5,637,979 | A | 6/1997 | Tamai et al. |
| 6,285,161 | B1 | 9/2001 | Popescu |
| 6,373,224 | B1 * | 4/2002 | Goto et al. ..................... 320/119 |
| 7,635,541 | B2 * | 12/2009 | Scott et al. ............... 429/231.95 |
| 2008/0203969 | A1 | 8/2008 | Kurihara et al. |

FOREIGN PATENT DOCUMENTS

| JP | 02-192670 | 7/1990 |
| JP | 10-145979 | 5/1998 |
| WO | WO 2007/102523 A1 | 9/2007 |

* cited by examiner

*Primary Examiner* — Edward Tso
*Assistant Examiner* — Ahmed Omar
(74) *Attorney, Agent, or Firm* — McDermott Will & Emery LLP

(57) ABSTRACT

A charging apparatus able to safely and reliably secure capacity is provided. The charging apparatus comprises: a charging current configuration unit that configures a set value for the charging current flowing to the battery; a charging current controller that controls the charging current on the basis of the set value configured by the charging current configuration unit; a cell voltage detector that detects the cell voltages applied to each cell; and a voltage determining unit that determines whether or not at least one of the cell voltages detected by the cell voltage detector has exceeded a threshold voltage. If it is determined by the voltage determining unit that at least one of the cell voltages has exceeded the threshold voltage, then the charging current configuration unit switches the set value to a smaller value.

4 Claims, 5 Drawing Sheets

CHARGING APPARATUS AND CHARGE CONTROL METHOD

RELATED APPLICATIONS

This application is the U.S. National Phase under 35 U.S.C. §371 of International Application No. PCT/JP2009/063903, filed on Jul. 30, 2009, which in turn claims the benefit of Japanese Application No. 2008-230477, filed on Sep. 9, 2008, the disclosures of which Applications are incorporated by reference herein.

TECHNICAL FIELD

The present invention relates to a charging apparatus and charge control method for charging a rechargeable (secondary) battery.

BACKGROUND ART

In the field of electric power tools, higher capacity and reduced weight is demanded for batteries driving cordless tools. In order to meet these demands, high power density lithium ion batteries are adopted in some cases. In lithium ion batteries, charging is primarily conducted by constant current and constant voltage control. One method of detecting full charge involves utilizing the property of the charging current decreasing once the charging voltage of the lithium ion battery reaches the maximum voltage. For example, Patent Literature 1 proposes a method wherein the charging current is detected during charging, and the battery is determined to be fully charged when the detected charging current falls below a predetermined current value.

Patent Literature 1: Unexamined Japanese Patent Application KOKAI Publication No. H2-192670

SUMMARY OF INVENTION

If a lithium ion battery like that described above is charged with an excessively high charging voltage, overvoltage will occur. Consequently, it is necessary for the charging apparatus to continuously monitor the charging voltage with high precision. For example, in a battery pack made up of a plurality of cells, the charging apparatus monitors the voltage of each cell. If there exists a cell whose voltage exceeds a predetermined voltage (hereinafter referred to as the overvoltage value) for determining whether or not any of the plurality of cells has reached an overvoltage state, then the charging apparatus determines that an overvoltage exists, and must abort charging.

However, charging might be aborted with the battery still in a low-capacity state if the charging apparatus is only configured to abort charging when the voltage of any cell exceeds the overvoltage value. Consequently, the above-mentioned overvoltage value must be set to the upper limit of the tolerance range for the power supply voltage. For example, consider the case wherein the voltage set during charging (hereinafter referred to as the constant voltage value) is 4.2 V per cell, and thus 4.2 V times the number of cells for the entire battery pack. In this case, it is necessary to set the overvoltage value to approximately +50 mV, or 4.25 V, per cell, and thus approximately 4.25 V times the number of cells for the entire battery pack, for example. At this point, it is also possible to set the overvoltage value to a value below the constant voltage value of 4.2 V times the number of cells, such as 4.15 V times the number of cells, for example. In this case, although a margin is produced between the overvoltage value and the tolerance range of the power supply voltage, battery capacity naturally decreases as well. Consequently, the overvoltage value to abort charging must be set within the extremely small range of 50 mV per cell, as described earlier.

In a state of little to no fluctuation in voltage among the cells of the battery, overvoltage is not determined even within the extremely small margin of 50 mV. However, the creation of voltage differences among battery cells due to usage frequency is inevitable. Such differences are due to the differing degrees of deterioration among individual cells, as a result of factors such as minute variations in the characteristics of the battery cells themselves, or the differing effects of heat arising from the arrangement of cells in the battery pack. Cells with a strong degree of deterioration have increased internal resistance compared to other cells, and thus voltage rise during charging also increases. Such voltage rise increases to the degree that the charging current is large. Thus, during charging, the charging current might cause only the cells with large degrees of deterioration to reach the overvoltage value mentioned above. In such cases, charging is aborted once even one cell reaches the overvoltage value, and thus charging is terminated with the capacity still small.

Consequently, the present invention has as an object to provide a charging apparatus able to safely and reliably achieve sufficient capacity, even when charging a rechargeable battery with differing degrees of deterioration among cells.

In order to achieve the above object, a charging apparatus in accordance with a first aspect of the present invention charges a battery made up of a plurality of serially connected cells by means of constant voltage and constant current control. The charging apparatus comprises: a charging current configuration unit that configures a set value for the charging current flowing to the battery; a charging current controller that controls the charging current on the basis of the set value configured by the charging current configuration unit; a cell voltage detector that detects the cell voltages applied to each cell; and a voltage determining unit that determines whether or not at least one of the cell voltages detected by the cell voltage detector has exceeded a threshold voltage. If it is determined by the voltage determining unit that at least one of the cell voltages has exceeded the threshold voltage, then the charging current configuration unit switches the set value to a small value.

The charging current configuration unit may also abort charging of the battery if the operation to switch the set value is repeated a predetermined number of times or more.

The charging apparatus may also comprise: a charging current detector that detects the charging current; a termination current configuration unit that configures a threshold current for each set value of the charging current configured by the charging current configuration unit; and a full charge determining unit that determines whether or not the charging current detected by the charging current detector is equal to or less than the threshold current configured by the termination current configuration unit. If it is determined by the full charge determining unit that the charging current is equal to or less than the threshold current, then charging of the battery is aborted.

In order to achieve the above object, a charge control method in accordance with a second aspect of the present invention is executed by a charging apparatus that charges a battery made up of a plurality of serially connected cells by means of constant voltage and constant current control. The charging apparatus comprises a charging current configuration unit, a charging current controller, a cell voltage detector, and a voltage determining unit. The charge control method comprises the steps of: causing the charging current configuration unit to configure a set value for the charging current flowing to the battery; causing the charging current controller to control the charging current on the basis of the set value configured by the charging current configuration unit; causing the cell voltage detector to detect the cell voltages applied to each cell; causing the voltage determining unit to determine whether or not at least one of the cell voltages detected by the cell voltage detector has exceeded a threshold voltage; and, if it is determined by the voltage determining unit that at least one of the cell voltages has exceeded the threshold voltage, causing the charging current configuration unit to switch the set value to a small value.

The charge control method may also comprise the step of causing the charging current configuration unit to abort charging of the battery if the operation to switch the set value is repeated a predetermined number of times or more.

The charging apparatus may also comprise a charging current detector, a termination current configuration unit, and a full charge determining unit. The charge control method may also comprise steps of: causing the charging current detector to detect the charging current; causing the termination current configuration unit to configure a threshold current for each set value of the charging current configured by the charging current configuration unit; causing the full charge determining unit to determine whether or not the charging current detected by the charging current detector is equal to or less than the threshold current configured by the termination current configuration unit; and, if it is determined by the full charge determining unit that the charging current is equal to or less than the threshold current, aborting charging of the battery.

According to the charging apparatus in accordance with an embodiment of the present invention, sufficient capacity is safely and reliably achieved, even when charging a rechargeable battery with differing degrees of deterioration among cells.

DESCRIPTION OF EMBODIMENT

Figure 1:
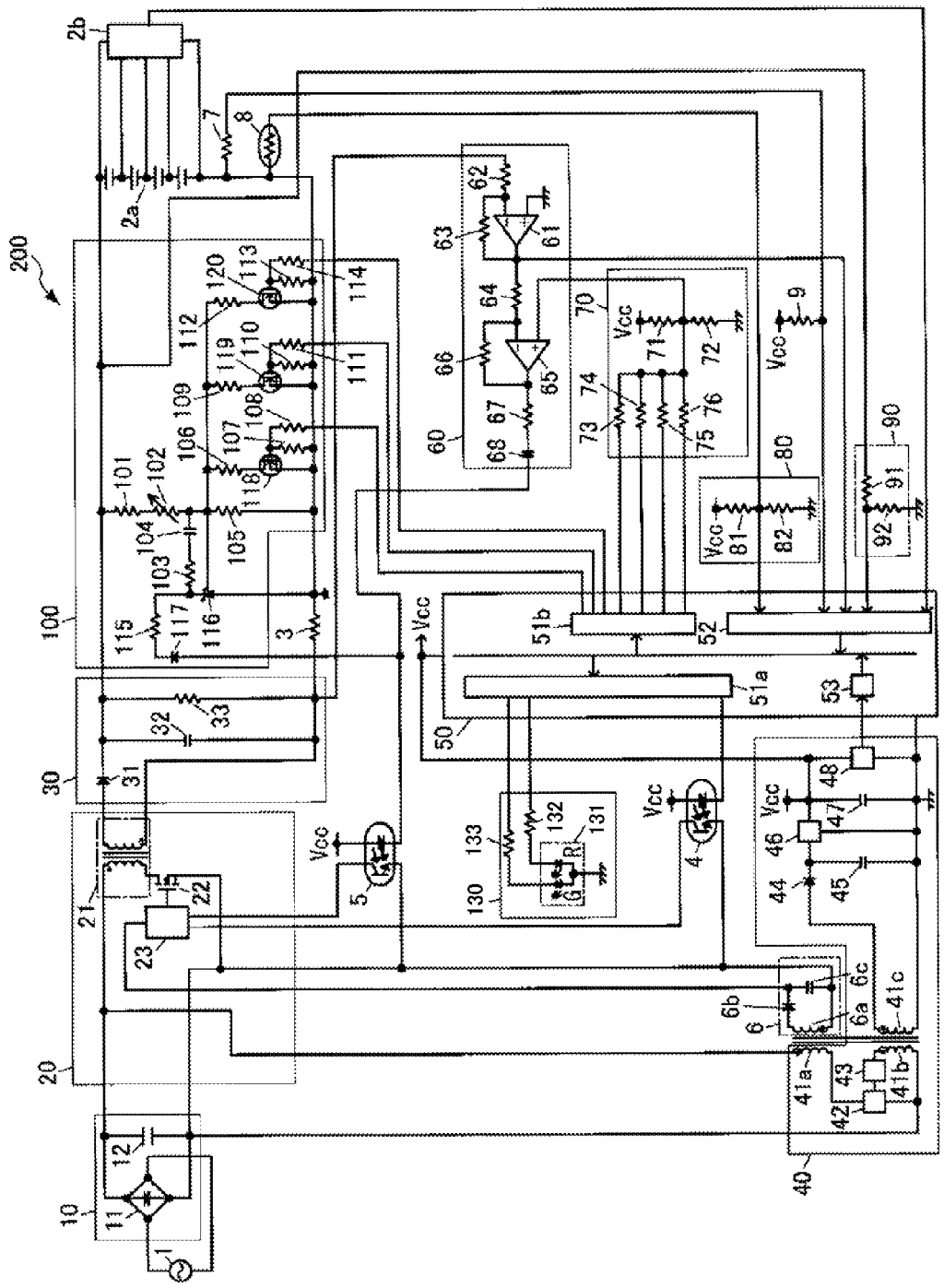
FIG. 1 is a circuit diagram of a charging apparatus in accordance with an embodiment of the present invention.

A charging apparatus in accordance with an embodiment of the present invention will now be described with reference to FIGS. 1 to 5. FIG. 1 is a circuit diagram illustrating a charging circuit 200 in accordance with an embodiment of the present invention. The charging circuit 200 is in a connected state with an AC power supply 1, and charges a battery pack 2a. The charging circuit 200 is provided with components such as a rectifying and smoothing circuit 10, a switching circuit 20, a rectifying and smoothing circuit 30, a charging voltage control circuit 100, a charging current detecting element 3, a charging current control circuit 60, a charging current configuring circuit 70, a photocoupler 5, a battery voltage detecting circuit 90, a photocoupler 4, and a microcontroller 50.

The rectifying and smoothing circuit 10 is made up of a full-wave rectifying circuit 11 and a smoothing capacitor 12, and rectifies and smoothes alternating current input from the AC power supply 1. The switching circuit 20 is made up of a high-frequency transformer 21, a MOSFET 22, and a PWM control IC (switching power supply) 23. The PWM control IC 23 is a switching power supply IC that regulates the output voltage of the rectifying and smoothing circuit 30 by varying the drive pulse width of the MOSFET 22 on the basis of a control signal input from the photocoupler 5. The photocoupler 5 is a charging current signal transmission circuit.

The rectifying and smoothing circuit 30 is made up of a diode 31, a smoothing capacitor 32, and a discharging resistor 33. The rectifying and smoothing circuit 30 rectifies and smoothes the output of the switching circuit 20, and outputs the results to the charging voltage control circuit 100.

The charging voltage control circuit 100 is made up of resistors 101, 103, 105, 106, 107, 108, 109, 110, 111, 112, 113, 114, and 115, a potentiometer 102, a capacitor 104, a shunt regulator 116, a rectifier diode 117, and FETs 118, 119, and 120. A partial voltage value of the charging voltage exists between a series resistor made up of the resistor 101 and the potentiometer 102, and a parallel resistor made up of the resistor 105 and the resistor 106, the resistor 109, or the resistor 112. This partial voltage value is determined so as to take the reference value of the shunt regulator 116. The resistors 106, 109, and 112 are respectively selected by a signal from the output port 51b of the microcontroller 50 by turning the FETs 118, 119, and 120 on or off. The potentiometer 102 is a variable resistor provided in order to finely regulate fluctuations in the individual resistance values among components (i.e., the individual resistance values of the resistors 105, 106, 109, and 112). The resistance values of the resistor 101 and the resistors 103, 105, 106, 109, and 112 are respectively determined so as to conform to the following parameters.

For example, the value determined by a series resistor made up of the resistor 101 and the potentiometer 102, and the resistor 105, may be determined to be a value for charging a 2-cell lithium ion battery. The value determined by a series resistor made up of the resistor 101 and the potentiometer 102, and a parallel resistor made up of the resistor 105 and the resistor 106 (i.e., the parallel resistor formed by turning on the FET 118), may be determined to be a value for charging a 3-cell lithium ion battery. In addition, the value determined by a series resistor made up of the resistor 101 and the potentiometer 102, and a parallel resistor made up of the resistor 105 and the resistor 109 (i.e., the parallel resistor formed by turning on the FET 119), may be determined to be a value for charging a 4-cell lithium ion battery. The value determined by a series resistor made up of the resistor 101 and the potentiometer 102, and a parallel resistor made up of the resistor 105 and the resistor 112 (i.e., the parallel resistor formed by turning on the FET 120), may be determined to be a value for charging a 5-cell lithium ion battery.

In addition, the output terminal of the potentiometer 102 is connected to the photocoupler 5 via the capacitor 104, the resistor 103, the resistor 115, and the diode 117. By transmitting a signal dependent on the output voltage of the charging voltage control circuit 100 to the PWM control IC 23, the charging voltage control circuit 100 outputs a charging voltage in accordance with the number of cells.

The current detecting element 3 is a resistor that detects the charging current flowing to the battery pack 2a. The current detecting element 3 is connected between the battery pack 2a and the output side of the rectifying and smoothing circuit 30.

The charging current control circuit 60 is made up of op-amps 61 and 65, resistors 62, 63, 64, 66, and 67, and a diode 68. The resistor 62 is connected between the rectifying and smoothing circuit 30 and the inverting input terminal of the op-amp 61, while the resistor 63 is connected between the inverting input terminal and the output terminal of the op-amp 61. The non-inverting input terminal of the op-amp 61 is grounded, while the output terminal is connected to the microcontroller 50 and the resistor 64. The resistor 64 is also connected to the inverting input terminal of the op-amp 65. The resistor 66 is connected between the inverting input terminal and the output terminal of the op-amp 65. The non-inverting input terminal of the op-amp 65 is connected to the charging current configuring circuit 70, while the output terminal is connected to the photocoupler 5 via the resistor 67 and the diode 68. The charging current control circuit 60 controls the charging current by outputting to the photocoupler 5 a signal dependent on the results of comparing the detected value of the charging current detected by the charging current detecting element 3 with the set value of the charging current configured by the charging current configuring circuit 70.

The charging current configuring circuit 70 is made up of resistors 71 to 76. The reference voltage Vcc is the reference value when the charging current is set using the value resulting from voltage division by the resistors 71 and 72. The resistors 73, 74, 75, and 76 are connected to the output port 51b of the microcontroller 50, and a low signal is output as appropriate from the output port 51b to which the respective resistors are connected. In so doing, the reference value is varied when setting the charging current, and as a result, the charging current can also be varied.

For example, if an output signal is not output from any port, the partial value of the reference voltage Vcc divided by the resistor 71 and the resistor 72 is output to the charging current control circuit 60, and becomes the reference value for setting the charging current. A signal dependent on this reference value is output from the charging current control circuit 60 to the photocoupler 5, and the charging current is varied by controlling the PWM control IC 23. The charging current at this point is taken to be the current $I1$. If a low signal has been output from the output port connected to the resistor 73, then the partial value divided by the parallel resistor made up of the resistor 71, the resistor 72, and the resistor 73 becomes the reference value when setting the charging current. The charging current at this point is taken to be the current $I2$, for example. Similarly, the charging currents for the cases when respective low signals have been output from the output ports connected to the resistors 74, 75, and 76 are taken to be $I3$, $I4$, and $I5$ (where $I1>I2>I3>I4>I5$).

The microcontroller 50 is a control circuit made up of output ports 51a and 51b, an A/D input port 52, and a reset port 53. The output port 51a outputs signals to the photocoupler 4 and display circuit 130. The output port 51b outputs a signal for setting the charging current to the charging current configuring circuit 70, and a signal for setting the charging voltage to the charging voltage control circuit 100. The A/D input port 52 receives signals from a cell count determining element 7, a temperature detecting circuit 80, and the battery voltage detecting circuit 90 as input.

The photocoupler 4 is a charge control signal transmission circuit. Upon receiving a control signal for initiating charging from the output port 51a of the microcontroller 50, the photocoupler 4 starts switching operations by transmitting the control signal to the PWM control IC 23. Subsequently, upon receiving a control signal for aborting charging, the photocoupler 4 aborts switching operations by transmitting the control signal to the PWM control IC 23.

The display circuit 130 is a display means for displaying the charging state, and is made up of an LED 131 and resistors 132 and 133. The LED 131 is configured to emit the three colors of red, green, and amber. Herein, red is taken to express the state before charging, amber is taken to express the state during charging, and green is taken to express the state after charging is finished.

In addition, the charging circuit 200 is provided with a power supply 40 acting as the power supply for components such as the microcontroller 50 and the op-amps 61 and 65, as well as a rectifying and smoothing circuit 6 acting as the power supply for the PWM control IC 23. The power supply 40 is made up of transformers 41a to 41c, a switching element 42, a controlling element 43, a rectifier diode 44, capacitors 45 and 47, a regulator 46, and a reset IC 48. The rectifying and smoothing circuit 6 is a rectifying and smoothing circuit that acts as the power supply for the PWM control IC 23, and is made up of a transformer 6a, a rectifier diode 6b, and a smoothing capacitor 6c.

The battery pack 2a is made up of a plurality of serially connected cells (also referred to as unit cells). In the present embodiment, a lithium ion battery is assumed. The battery pack 2a is connected to a protection IC 2b, a cell count determining element 7, and a battery temperature detecting element 8. Each cell of the battery pack 2a is connected to the protection IC 2b. The protection IC 2b monitors the battery voltage on a per-cell basis, and if it determines that any one of the plurality of cells constituting the battery pack 2a is in an overvoltage or overdischarge state, then the protection IC 2b outputs a signal indicating the overvoltage or the overdischarge to the microcontroller 50 via the terminals between the charging apparatus and the battery. Herein, overvoltage refers to the case wherein it is determined that the cell voltage is higher than a predetermined voltage for determining whether or not an overvoltage state exists (hereinafter referred to as the overvoltage value). On the other hand, overdischarge refers to the state wherein it is determined that the cell voltage is lower than a predetermined voltage (different from the overvoltage value) for determining whether or not an overdischarge state exists.

In the charging circuit 200, there is provided a cell count determining resistor 7 adjacent to the battery pack 2a. The resistance of the cell count determining resistor 7 and a cell count determining circuit 9 divides the value of the reference voltage Vcc. The partial value is input into the A/D input port 52 of the microcontroller 50. The microcontroller 50 then sets the charging voltage in accordance with the number of cells by turning the FETs 118, 119, and 120 on or off.

In the charging circuit 200, there is also provided a thermistor or similar temperature-sensitive element 8 adjacent to the battery pack 2a. The temperature-sensitive element 8 transmits a signal dependent on the temperature of the battery pack 2a to the battery temperature detecting circuit 80.

The battery temperature detecting circuit 80 is made up of resistors 81 and 82. The reference voltage Vcc is divided by a parallel resistor made up of the temperature-sensitive element 8 and the resistor 82, and by the resistor 81. This partial value is then output to the A/D input port 52 of the microcontroller 50 as battery temperature information.

The battery voltage detecting circuit 90 is made up resistors 91 and 92. The battery voltage detecting circuit 90 is connected to the plus side of the battery pack 2a. The battery voltage is divided by the resistors 91 and 92. This partial value is then input into the A/D input port 52 of the microcontroller 50 as battery voltage information.

Figure 2:
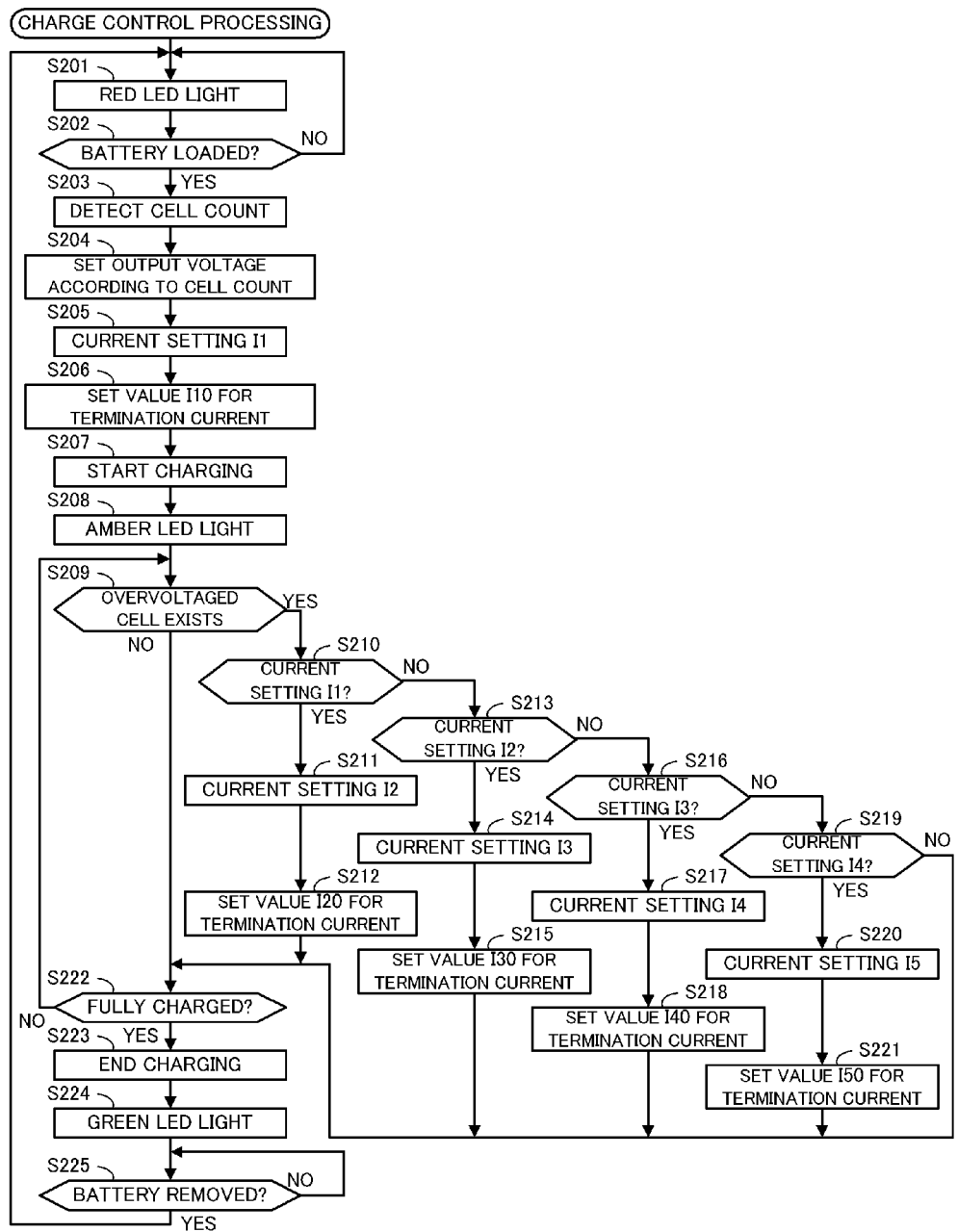
FIG. 2 is a flowchart illustrating the charge control operations of a charging apparatus in accordance with an embodiment of the present invention.

Exemplary operation of the charge control in an embodiment of the present invention will now be described using the flowchart in FIG. 2.

First, when the power supply is switched on, the microcontroller 50 performs an initial set of the output ports 51*a* and 51*b*. Next, the microcontroller 50 controls the display circuit 130 to display the state before charging. In the present embodiment, the microcontroller 50 displays the state before charging by outputting a high signal from the output port 51*a* of the microcontroller 50 connected to the resistor 133 of the display circuit 130, thereby causing the display circuit 130 to light red (step S201). Next, the microcontroller 50 determines whether or not a battery is connected to the charger (step S202). A battery may be determined to be connected if, for example, there is a change in the value in the A/D input port 52 of the microcontroller 50 input via the battery temperature detecting circuit 80. If the microcontroller 50 determines that a battery is not connected to the charger (step S202: NO), then the process in step S202 is executed again. In contrast, if the microcontroller 50 determines that a battery is connected to the charger (step S202: YES), then the microcontroller 50 subsequently determines the cell count on the basis of the value in the A/D input port 52 of the microcontroller 50 input via the cell count determining circuit 9 (step S203). Next, the microcontroller 50 sets the output voltage on the basis of the cell count determined in step S203 (step S204).

The partial value of the output voltage divided by a series resistor made up of the resistor 101 and the potentiometer 102, and by a parallel resistor made up of the resistor 105 and the resistor 106, the resistor 109, or the resistor 112, is determined so as to be equal to the reference value of the shunt regulator 116. For example, in the present embodiment, the value determined by a series resistor made up of the resistor 101 and the potentiometer 102, and the resistor 105, is taken to be the value for charging a 2-cell lithium ion battery. The value determined by a series resistor made up of the resistor 101 and the potentiometer 102, and a parallel resistor made up of the resistor 105 and the resistor 106 (i.e., the parallel resistor formed by turning on the FET 118 as a result of outputting a signal from the output port 51*b* of the microcontroller 50), is taken to be the value for charging a 3-cell lithium ion battery. In addition, the value determined by a series resistor made up of the resistor 101 and the potentiometer 102, and a parallel resistor made up of the resistor 105 and the resistor 109 (i.e., the parallel resistor formed by turning on the FET 119 as a result of outputting a signal from the output port 51*b* of the microcontroller 50), is taken to be the value for charging a 4-cell lithium ion battery. The value determined by a series resistor made up of the resistor 101 and the potentiometer 102, and a parallel resistor made up of the resistor 105 and the resistor 112 (i.e., the parallel resistor formed by turning on the FET 120 as a result of outputting a signal from the output port 51*b* of the microcontroller 50), is taken to be the value for charging a 5-cell lithium ion battery.

Next, the microcontroller 50 sets the charging current for charging to I1 (step S205). The charging current may be set to I1 by not outputting a signal from the output port connected to the resistors 73, 74, 75, and 76. Hereinafter, the set value for the charging current will be referred to as the current setting, where appropriate.

In addition, the microcontroller 50 also sets the value of the termination current corresponding to the charging current I1 (step S206). In the present embodiment, it is assumed that a lithium ion battery is charged by constant current and constant voltage control, and thus a full charge is determined when the charging current falls below a predetermined current (the termination current) during the constant voltage control. In the case where the charging current is the current I1, a current I10, for example, is determined as the set value for the corresponding termination current. In other words, if the charging current becomes smaller than the current I10 set as the termination current, then charging is considered complete, and charging is terminated. This takes advantage of the fact that while the charging current is maintained at the set value of the current I1 for some time after initiating charging, the charging current gradually decreases as charging approaches completion.

Subsequently, the microcontroller 50 initiates charging by outputting a high signal from the output port 51*a*, which causes the signal to be transmitted to the PWM control IC 23 via the photocoupler 4 (step S207). Once charging is initiated, the microcontroller 50 controls the display circuit 130 to display the state during charging (step S208). For example, the microcontroller 50 may display the state during charging by outputting a high signal from the output port connected to the resistor 132 and the resistor 133 of the display circuit 130, thereby causing the display circuit 130 to light amber.

The microcontroller 50 then determines whether or not there exists a cell in an overvoltage state (step S209). More specifically, the microcontroller 50 determines whether or not an overcharge signal has been input. Herein, an overcharge signal is a signal indicating overcharging that is output from the protection IC 2*b* within the battery pack if any one of the plurality of cells exhibits a voltage equal to or greater than an overvoltage value.

If it is determined that an overvoltaged cell exists (step S209: YES), then the microcontroller 50 determines whether or not the charging current is I1 (step S210). The determination of whether or not the charging current is I1 may be made on the basis of the set value for the charging current, or on the basis of a detected value from the current detecting element 3. If it is determined that the charging current is I1 (step S210: YES), then the microcontroller 50 lowers the charging current to I2 (where I2<I1) (step S211; time t3 in FIG. 5). The microcontroller 50 may set the charging current to I2 by outputting a low signal from the output port 51*b* connected to the resistor 73. By lowering the charging current, the battery voltage temporarily drops, and the overcharge signal ceases to be output from the protection IC 2*b* within the battery pack. After that, the battery voltage starts to rise again.

Next, the microcontroller 50 sets the value of the termination current corresponding to the charging current I2 (step S212). In the case where the charging current is I2, the microcontroller 50 determines a current I20, for example, as the set value for the corresponding termination current.

If it is determined in step S210 that the charging current is not I1 (step S210: NO), then the microcontroller 50 determines whether or not the charging current is I2 (step S213). If it is determined that the charging current is I2 (step S213: YES), then the microcontroller 50 lowers the charging current to I3 (where I3<I2) (step S214; time t4 in FIG. 5). The microcontroller 50 may set the charging current to I3 by outputting a low signal from the output port 51*b* connected to the resistor 74. By lowering the charging current, the battery voltage temporarily drops, and the overcharge signal ceases to be output from the protection IC 2*b* within the battery pack. After that, the battery voltage starts to rise again.

Next, the microcontroller 50 sets the value of the termination current corresponding to the charging current I3 (step S215). In the case where the charging current is I3, the microcontroller 50 determines a current I30, for example, as the set value for the corresponding termination current.

If it is determined in step S213 that the charging current is not I2 (step S213: NO), then the microcontroller 50 determines whether or not the charging current is I3 (step S216). If it is determined that the charging current is I3 (step S216: YES), then the microcontroller 50 lowers the charging current to I4 (where I4<I3) (step S217; time t5 in FIG. 5). The microcontroller 50 may set the charging current to I4 by outputting a low signal from the output port 51b connected to the resistor 75. By lowering the charging current, the battery voltage temporarily drops, and the overcharge signal ceases to be output from the protection IC 2b within the battery pack. After that, the battery voltage starts to rise again.

Next, the microcontroller 50 sets the value of the termination current corresponding to the charging current I4 (step S218). In the case where the charging current is I4, the microcontroller 50 determines a current I40, for example, as the set value for the corresponding termination current.

If it is determined in step S216 that the charging current is not I3 (step S216: NO), then the microcontroller 50 determines whether or not the charging current is I4 (step S219). If it is determined that the charging current is I4 (step S219: YES), then the microcontroller 50 lowers the charging current to I5 (where I5<I4) (step S220; time t6 in FIG. 5). The microcontroller 50 may set the charging current to I5 by outputting a low signal from the output port 51b connected to the resistor 76. By lowering the charging current, the battery voltage temporarily drops, and the overcharge signal ceases to be output from the protection IC 2b within the battery pack. After that, the battery voltage starts to rise again.

Next, the microcontroller 50 sets the value of the termination current corresponding to the charging current I5 (step S221). In the case where the charging current is I5, the microcontroller 50 determines a current I50, for example, as the set value for the corresponding termination current.

If it is determined in step S219 that the charging current is not I4 (step S219: NO), then the microcontroller 50 considers the battery pack to be charged by the charging current I5, and terminates charging (step S223; time t7 in FIG. 5).

Additionally, if it is determined that an overvoltaged cell does not exist (step S209: NO), or upon completion of step S212, S215, S218, or S221, the microcontroller 50 determines whether or not the battery pack is fully charged (step S222). More specifically, the microcontroller 50 determines, on the basis of, for example, a detected value from the current detecting element 3, whether or not the charging current is less than or equal to the termination current. As described earlier, in the present embodiment, it is assumed that a lithium ion battery is charged by constant current and constant voltage control, and thus a full charge is determined when the charging current falls below the termination current during the constant voltage control. Consequently, if it is determined that the charging current is less than or equal to the termination current, the microcontroller 50 determines that the battery pack is fully charged. Herein, the values set in steps S206, S212, S215, S218, and S221 for each current setting are used as the termination currents.

If it is determined that the battery pack is fully charged (step S222: YES), then the microcontroller 50 terminates charging (step S223). More specifically, the microcontroller 50 puts the PWM control IC 23 in a suspended state by outputting a high signal from the port in the output port 51a connected to the photocoupler 4. After charging suspension, the microcontroller 50 causes the display of the display circuit 130 to light green (step S224). More specifically, in order to cause the display circuit 130 to light green, the microcontroller 50 outputs a high signal from the output port 51a connected to the resistor 113 of the display circuit 130. Subsequently, the microcontroller 50 determines whether or not the battery has been removed from the charger (step S225). If it is determined that the battery has not been removed from the charger (step S225: NO), then the microcontroller 50 executes the processing in step S225 again. In contrast, if it is determined that the battery has been removed from the charger (step S225: YES), then the microcontroller 50 returns to step S201.

Figure 3:
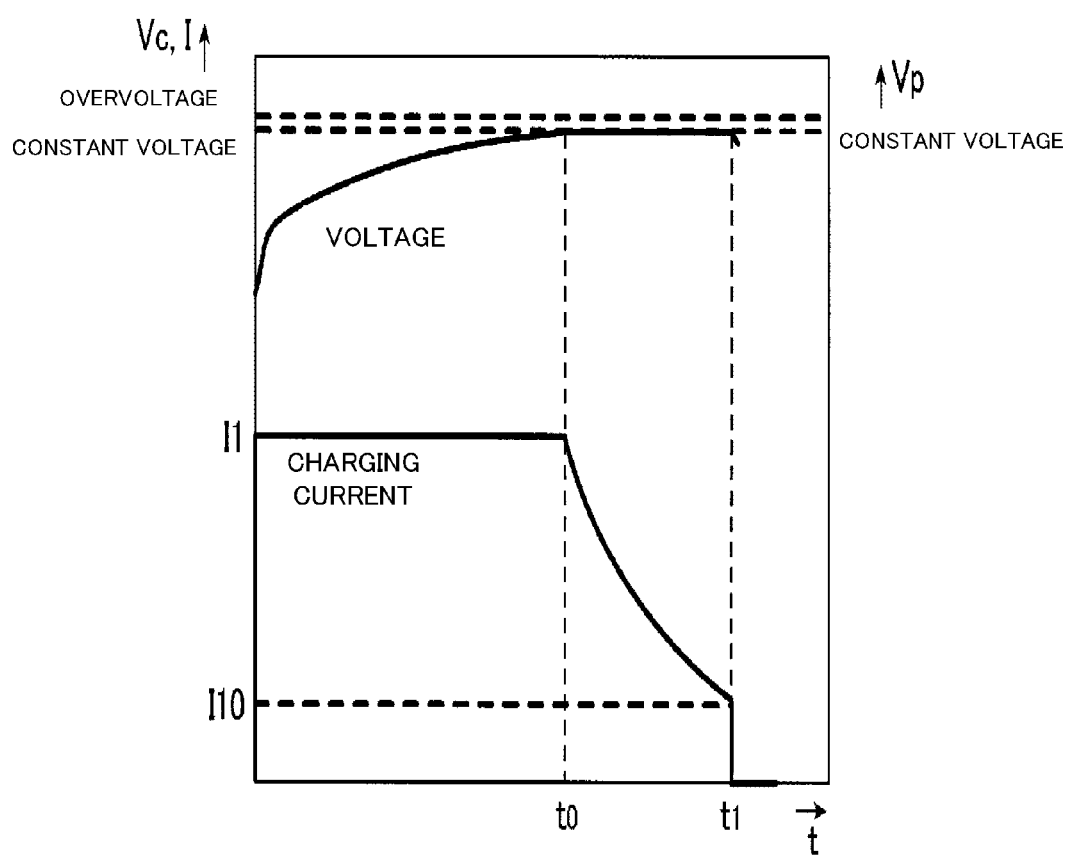
FIG. 3 illustrates the change in charging current and charging voltage in a charging apparatus in accordance with an embodiment of the present invention.

Next, the change in current and voltage during charging when charging by means of the control described earlier will be described in detail and with reference to FIGS. 3 to 5. FIG. 3 illustrates an example of a charging waveform during normal operation (i.e., when none of the plurality of cells is determined to be overvoltaged) of the charging apparatus in the present embodiment. The horizontal axis indicates the time t, while the vertical axis indicates the charging current I, the per-cell voltage Vc, and the battery pack voltage Vp (hereinafter referred to as the battery voltage). In the present embodiment, overvoltage is determined using the per-cell voltage Vc, while the constant voltage is determined using the battery voltage Vp of the entire battery pack 2a. In order to ease understanding, both the per-cell voltage Vc and the battery voltage Vp are indicated by a single curve in FIG. 3, but it should be appreciated that the battery voltage Vp is roughly the value of the voltage Vc multiplied by the number of cells. In other words, FIG. 3 illustrates an example of the case wherein the battery pack is made up of a single cell, or alternatively, the case wherein the battery pack is made up of cells whose individual characteristics exhibit no fluctuations.

Once charging is initiated, charging is first conducted with a constant current (in the present embodiment, the charging current I1. As the current flows, the per-cell voltage Vc and the battery voltage Vp start to rise. At some point, the battery voltage Vp reaches the constant voltage value set by the constant voltage control circuit 100. The constant voltage value herein is a voltage value determined in advance to be equal to 4.2 V per cell, for example. In the case where the battery pack 2a is made up of four cells, the constant voltage value becomes 4.2 V times 4, or 16.8 V. When the battery voltage Vp reaches the constant voltage value (such as Vp=16.8 V, for example, at a time t0), the charging current I begins to decrease. Subsequently, a full charge is determined at the time when the charging current I reaches the termination current (I10 in the case of the charging current I1), and charging is aborted (time t1).

Figure 4:
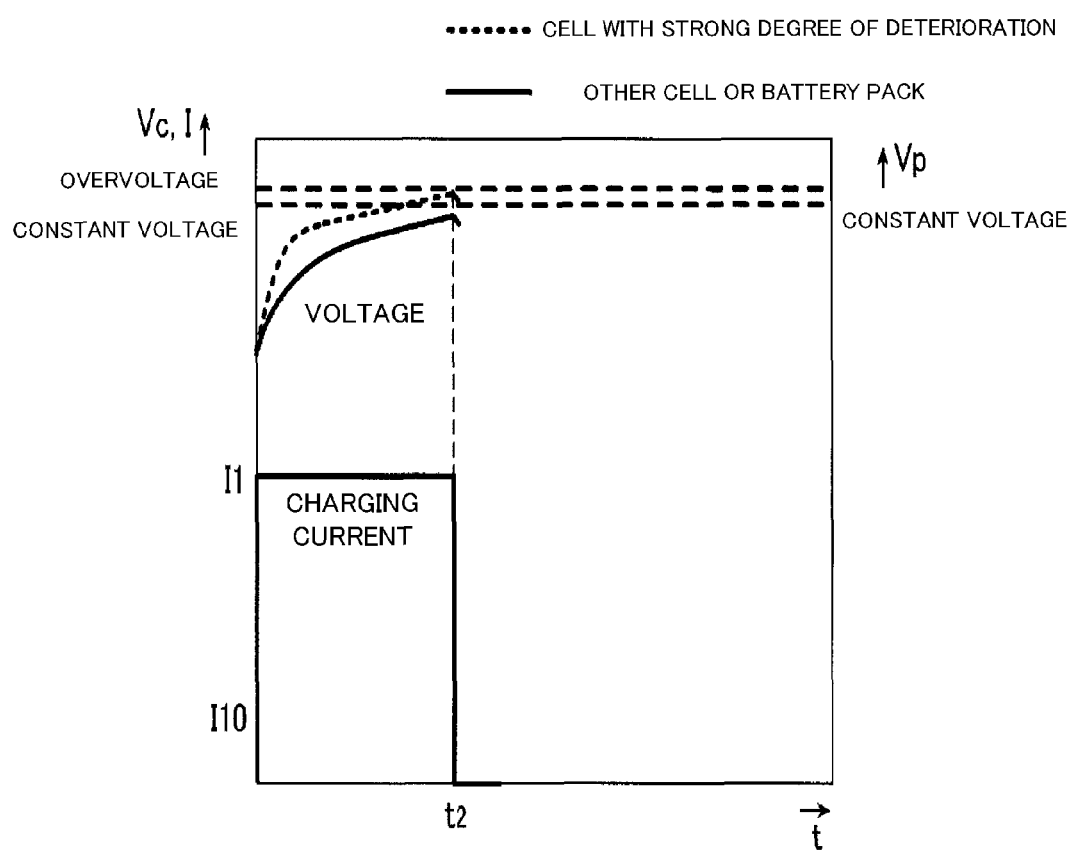
FIG. 4 illustrates the change in charging current and charging voltage in a charging apparatus of the related art.

On the other hand, consider the case wherein the voltage balance among cells falls apart as shown in FIG. 4, and one of the plurality of cells reaches the overvoltage value at which overcharging is determined. FIG. 4 illustrates an example of a charging waveform in the case where charging is aborted because one of the plurality of cells reaches a voltage equal to or greater than the overvoltage value. The horizontal axis indicates the time t, while the vertical axis indicates the charging current I, the per-cell voltage Vc, and the battery voltage Vp. As shown by the broken line in FIG. 4, the voltage of a cell with a strong degree of deterioration reaches the overvoltage value at the time t2. In contrast, the voltages of the other cells do not reach the overvoltage value at the time t2. Consequently, the battery voltage Vp does not reach the constant voltage value at the time t2. Charging would be aborted at this point by the control of a charging apparatus of the related art, because just one of the plurality of cells in the battery pack 2a reached a voltage equal to or greater than the overvoltage value.

In such a control, if the fluctuations in the small voltages among cells are large, then charging is stopped at an insufficient stage. As a result, the battery pack is not charged to its correct charge amount. Such a phenomenon more readily occurs with smaller differences between the overvoltage value and the constant voltage value for determining charging in the charging voltage control circuit 100 shown in FIG. 1. For example, if the constant voltage value is taken to be 4.20 V times the number of cells, then the suspension of charging will occur more readily if the overvoltage value is set to 4.25 V per cell rather than 4.35 V per cell, as described earlier. In other words, the reliable elimination of battery deterioration due to overcharging and the securing of battery capacity become opposing elements.

Figure 5:
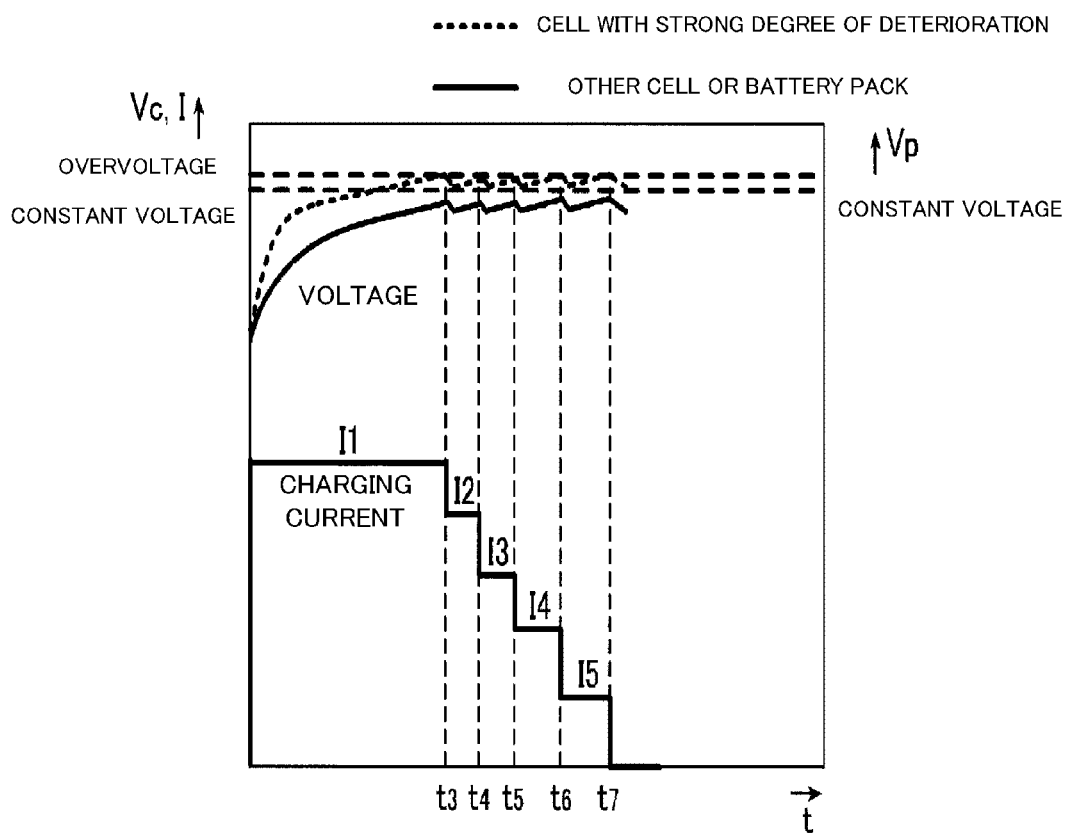
FIG. 5 illustrates the change in charging current and charging voltage in a charging apparatus in accordance with an embodiment of the present invention.

FIG. 5 illustrates an example of a charging waveform in the charging apparatus of the present embodiment, in the case where one of the plurality of cells has reached a voltage equal to or greater than the overvoltage value. The horizontal axis indicates the time t, while the vertical axis indicates the charging current I, the per-cell voltage Vc, and the battery voltage Vp. In the present embodiment, when a given cell (i.e., a cell with a strong degree of deterioration) reaches a voltage equal to or greater than the overvoltage value, the charging current (strictly speaking, the set current for the set value of charging voltage) is lowered (time t3). When the charging current is lowered, the battery voltage temporarily drops below that overvoltage value, and thus charging is continued. The battery voltage subsequently rises again, and upon reaching the overvoltage value, the charging current is lowered even further (time t4). This operation is subsequently repeated (times t4, t5, and t6), and after repeating a predetermined number of times, charging is aborted (time t7). By conducting control in this way, correct charging can be conducted without leading to an excessive lack of capacity, even when the overvoltage value is set to within a very narrow range with respect to the constant voltage value for safety, such as plus 1.2% per cell.

As one example, consider a battery with a capacity of 1.5 ampere-hours (Ah). When conducting a control like that shown in FIG. 4, such a battery is charged to 0.7 Ah, but when conducting a control in accordance with the present embodiment like that shown in FIG. 5, the battery can be charged to 1.3 Ah.

It should be appreciated that the microcontroller 50 and the charging current configuring circuit 70 are herein equivalent to a charging current configuration unit. In addition, the charging current control circuit 60 is equivalent to a charging current controller. The protection IC 2b and the microcontroller 50 are equivalent to a cell voltage detector. Additionally, the microcontroller 50 is equivalent to a voltage determining unit, a termination current configuration unit, and a full charge determining unit. Furthermore, the charging current detecting element 3 is equivalent to a charging current detector.

As described in the foregoing, according to a charging apparatus in accordance with the present embodiment, the respective voltage values for a plurality of cells constituting a battery pack are detected. If even one of the detected voltage values exceeds a predetermined overvoltage value, then the overcharge state is temporarily resolved by switching the charging current to a lower current value, and charging is continued. By repeating such a current value switching operation, it becomes possible to increase battery capacity while avoiding battery deterioration and without producing overvoltage. Thus, capacity can be secured safely and reliably, even when there are differing degrees of deterioration among cells.

In addition, by stopping charging after repeating the charging current switching operation a predetermined number of times, sufficient capacity is secured without overlong charging times. Furthermore, a full charge can be determined when the charging current reaches the termination current without the voltage of any cell reaching the overvoltage value, or when the charging current set after a switching operation reaches the termination current set in accordance with the current setting at that time. Consequently, it is possible to efficiently secure sufficient capacity.

A charging apparatus in accordance the present invention is not limited to the foregoing embodiment, and various modifications and alterations are possible. For example, although the charging of a lithium ion battery is assumed in the present embodiment, the present invention is widely applicable to batteries charged by constant current and constant voltage control. In particular, the present invention is effective with batteries having the property of little to no clearance between the overvoltage value and the constant voltage value.

The set values for the overvoltage value and the constant voltage value are not limited to the foregoing, and other set values may be used. In this case, the advantages of the present invention increase, since the securing of battery capacity under constant voltage and constant current control becomes more difficult with smaller differences between the overvoltage value and the constant voltage value. In addition, since the possibility of fluctuations in the degrees of deterioration in the battery increases with larger numbers of cells constituting the battery pack, the advantages of the invention also increase.

The switching operation to switch the set value of the current when the overvoltage value is reached is not limited to the foregoing, and is preferably determined appropriately from the perspectives of charging time and capacity yield.

Other layouts may also be used for the circuit layout of the charging apparatus, as long as such layouts have similar actions and effects.

This application is based on Japanese Patent Application No. 2008-230477. The specifications, scope of the patent claims, and drawings of Japanese Patent Application No. 2008-230477 are hereby incorporated in their entirety in this specification.

INDUSTRIAL APPLICABILITY

A charging apparatus in accordance with an embodiment of the present invention can be used to charge various rechargeable batteries, such as lithium ion batteries.

The invention claimed is:

1. A charging apparatus that charges a battery made up of a plurality of serially connected cells by means of constant voltage and constant current control, the charging apparatus comprising:
   a charging current configuration unit that configures a set value for a charging current flowing to the battery;
   a charging current controller that controls the charging current on the basis of the set value configured by the charging current configuration unit;
   a cell voltage detector that detects the cell voltages applied to each cell;
   a voltage determining unit that determines whether or not at least one of the cell voltages detected by the cell voltage detector has exceeded a threshold voltage;
   a charging current detector that detects the charging current;
   a termination current configuration unit that configures a threshold current for each set value of the charging current configured by the charging current configuration unit; and
   a full charge determining unit that determines whether or not the charging current detected by the charging current detector is equal to or less than the threshold current configured by the termination current configuration unit, wherein:
if it is determined by the voltage determining unit that at least one of the cell voltages has exceeded the threshold voltage, then the charging current configuration unit switches the set value to a smaller value, and if it is determined by the full charge determining unit that the charging current is equal to or less than the threshold current, then charging of the battery is aborted.

2. The charging apparatus according to claim 1, characterized in that the charging current configuration unit aborts charging of the battery if the operation to switch the set value is repeated a predetermined number of times or more.

3. A charge control method executed by a charging apparatus that charges a battery made up of a plurality of serially connected cells by means of constant voltage and constant current control, the charging apparatus comprising: a charging current configuration unit, a charging current controller, a cell voltage detector, a voltage determining unit, a charging current detector, a termination current configuration unit, and a full charge determining unit, and the charge control method comprising steps of:
causing the charging current configuration unit to configure a set value for a charging current flowing to the battery;

causing the charging current controller to control the charging current on the basis of the set value configured by the charging current configuration unit;

causing the cell voltage detector to detect the cell voltages applied to each cell;

causing the voltage determining unit to determine whether or not at least one of the cell voltages detected by the cell voltage detector has exceeded a threshold voltage;

causing the charging current detector to detect the charging current;

causing the termination current configuration unit to configure a threshold current for each set value of the charging current configured by the charging current configuration unit; and causing the full charge determining unit to determine whether or not the charging current detected by the charging current detector is equal to or less than the threshold current configured by the termination current configuration unit, wherein:
if it is determined by the voltage determining unit that at least one of the cell voltages has exceeded the threshold voltage, causing the charging current configuration unit to switch the set value to a smaller value, and if it is determined by the full charge determining unit that the charging current is equal to or less than the threshold current, aborting charging of the battery.

4. The charge control method according to claim 3, characterized by further comprising the step of:
causing the charging current configuration unit to abort charging of the battery if the operation to switch the set value is repeated a predetermined number of times or more.

* * * * *